Patented June 6, 1950

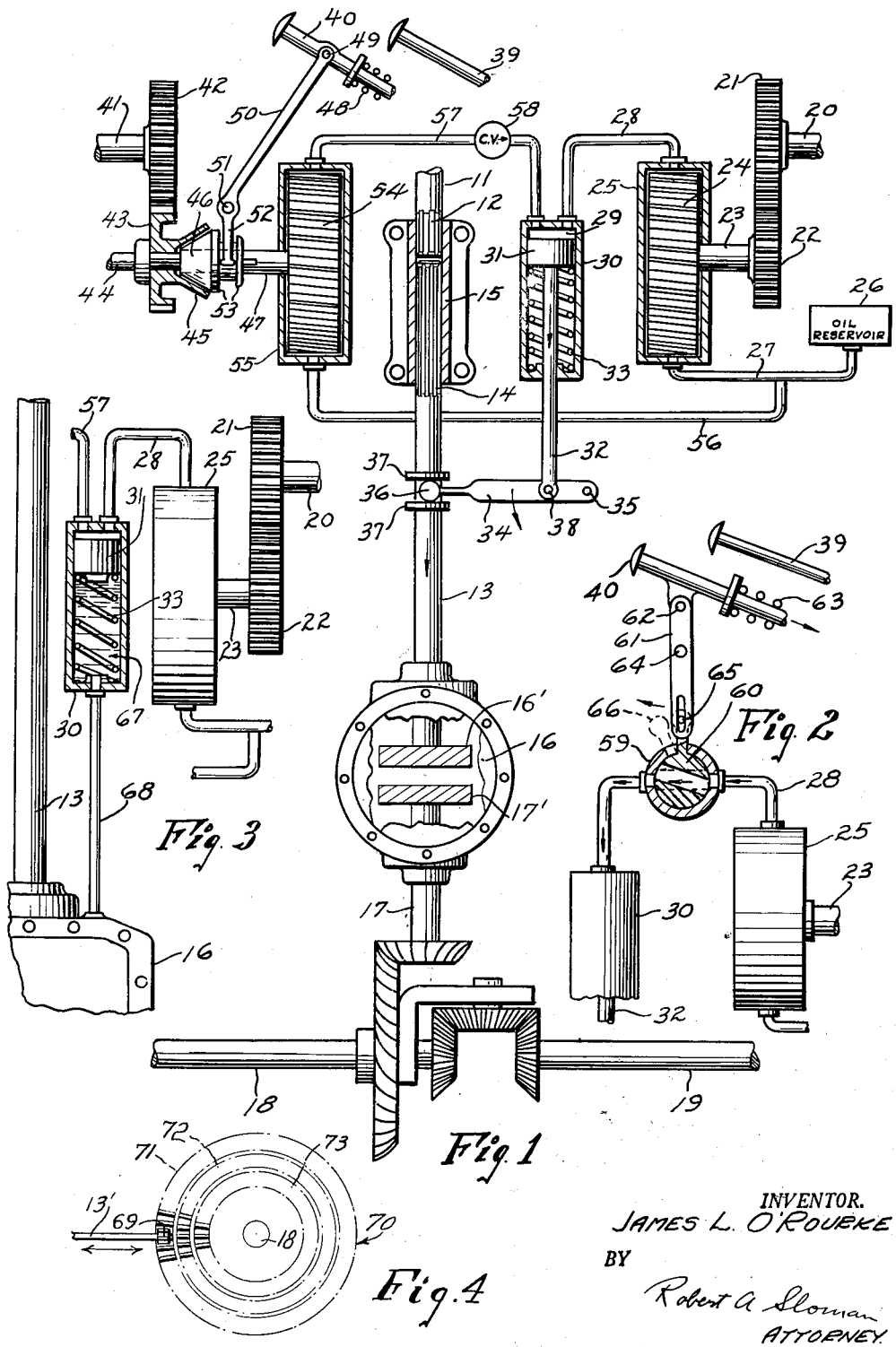

2,510,516

UNITED STATES PATENT OFFICE 2,510,516

TRANSMISSION CONTROL

James L. O'Rourke, Detroit, Mich.

Application January 8, 1947, Serial No. 720,868

10 Claims. (Cl. 192—.033)

1

This invention relates to vehicle transmissions, and more particularly to an automatically operatable transmission control progressively responsive to increases in the speed of the vehicle or its moving parts.

It is the object of this invention to provide means associated with preferably a hydraulic transmission for increasing the effectiveness thereof as the speed of the vehicle increases. In other words, means are provided for automatically regulating the transmission from "low" to "high."

It is the further object of this invention to provide hydraulic means for bodily moving the fluid driving vanes of a hydraulic transmission towards the fluid driven vanes therein as the speed of the vehicle increases to reduce the speed ratio between the motor drive shaft and the vehicle differential.

It is the further object of this invention to provide means for retaining this reduced ratio throughout reduction in speed of motion if desired.

It is the further object of this invention to provide speed responsive hydraulically operable means for increasing the volume of fluid in the vehicle fluid transmission to thereby increase its effectiveness as the vehicle speed is increased.

These and other objects will be seen from the following specification and claims in conjunction with the appended drawing in which:

Figure 1 is a diagrammatic view partially in section illustrating a vehicle transmission, differential and hydraulic transmission control.

Figure 2 is a fragmentary diagrammatic view illustrating a different form of transmission controlling mechanism.

Figure 3 is a fragmentary diagrammatic view of a different form of hydraulic transmission control.

Figure 4 is a fragmentary diagrammatic illustration of a different type of transmission embodying the present invention.

It will be understood that the above drawing illustrates merely one preferable embodiment of the invention, and that other embodiments are contemplated within the scope of the claims hereafter set out.

Referring to the drawing, motor operated drive shaft 11, splined at 12, transmits rotative motion to longitudinally reciprocal transmission operating shaft 13 which is splined at 14, by means of interconnecting splined coupling 15. The latter rotates with shafts 11 and 13, and permits longitudinal sliding movements of the latter shaft.

2

Operating shaft 13 projects into the conventional hydraulic transmission 16 for rotating a vaned element 16' therein, to effect rotation of the fluid within said transmission. A second vaned element, 17' spaced from said first vaned element is carried within said transmission upon the inner end of power shaft 17 for driving the vehicle axles 18 and 19, all in a conventional well known manner as illustrated in the drawing.

The transmission and differential themselves form no part of the present invention except as elements illustrating the operation of the device, and their detailed description is omitted. The invention moreover relates to hydraulic means for varying the spaced relation between the drive and driven vanes 16' and 17' respectively within transmission 16.

This is effected by causing longitudinal movements of operating shaft 13, whereby its vaned element 16' is projected towards or away from the driven vaned element 17' within said transmission.

Referring to Figure 1 rotatable shaft 20 is joined to some moving part of the vehicle whose rotative speed is related or proportional to the speed of movement of the vehicle as for instance one of its front wheels.

Gear 21 on shaft 20 meshes with gear 22 on turbine shaft 23 for effecting rotation of impeller wheel 24 within turbine housing 25. Oil reservoir 26 supplies oil to the bottom interior of housing 25 through interconnecting conduit 27.

Rotation of vaned impeller 24 thus delivers pressure fluid through conduit 28 to chamber 29 within the top of hydraulic cylinder 30 for effecting movement of piston 31 and rod 32 joined thereto and projected from said cylinder.

Piston 31 normally assumes the position shown in the drawing under the action of coiled spring 33 interposed between said piston and the lower end of said cylinder. Lever 34 is pivotally mounted at 35 at one end, with its other formed end 36 projecting between spaced collars 37 on shaft 13.

The lower end of shaft 32 is pivotally joined at 38 to lever 34 intermediate its ends whereby movements of piston 31 effect corresponding translatory movements of rotary shaft 13.

With the vehicle stationary if shaft 20 is operatively joined to the front wheel, no pressure fluid is delivered to cylinder 30 and shaft 13 is in the position shown in the drawing with its vaned member 16' within transmission 16 at its greatest distance from the driven vaned element 17' on the end of shaft 17.

On initial slow movement of the vehicle pressure fluid is delivered to chamber 29 in cylinder 30 though there will be no movement of piston 31 until the speed of the vehicle is such that the pressure fluid developed by the aforesaid turbine exceeds the pressure exerted by spring 33.

On said initial movement the vehicle transmission is in "low" with the greatest speed ratio between shafts 13 and 17. As the vehicle picks up speed the fluid pressure in chamber 29 increases gradually moving piston 31 and shaft 13 till it reaches the translative position where its vaned element 16' within transmission 16 is closest to the driven vaned element 17' therein. The transmission is now in "high," with the speed ratio between shafts 13 and 17 the lowest. Naturally certain intermediate speeds less than a moderate speed will result in an intermediate speed ratio of the transmission inasmuch as said turbine will be delivering pressure fluid at a reduced pressure.

For the initial movements of the vehicle the accelerator 39 is used, as fragmentarily shown, to control gasoline, or other fuel to the vehicle carburetor to regulate the speed thereof. It will be seen from the mechanism described that reduction in speed might produce an undesired increase of the speed ratio of the transmission, i. e., a return to "low." Consequently, where it is desired to maintain the lower speed ratio as in continuous driving, once a moderate speed is reached, the operator will change over to second accelerator 40.

The second accelerator functions in the same manner as the first accelerator, and in addition serves to control the flow of additional pressure fluid into chamber 29, so that a reduction of speed of the vehicle will not cause piston 31 to return to the initial low speed position. The vehicle then stays in "high" throughout variations in the speed of the vehicle because chamber 29 is receiving supplemental pressure fluid.

Shaft 41 operatively joined to the other front wheel for instance, carries gear 42 which meshes with gear 43 rotatably journaled on shaft 44. The latter gear carries a cone type clutch member 45 upon its hub adapted for frictional engagement with cone shaped clutch member 46 slidably keyed to turbine shaft 47 for rotating the latter.

Accelerator 40 retained normally inoperative by spring 48, is pivotally joined at 49 to the end of lever 50. Said lever is pivotally mounted intermediate its ends at point 51, with its other end preferably forked at 52 to engage opposite sides of shaft 47 between shoulders 53.

Thus manual application of accelerator 40 will maintain the speed of the vehicle motor as desired, and in addition causes cooperative engagement of clutch members 45 and 46 to effect rotation of turbine shaft 47.

Impeller wheel or vaned member 54 is rotatably mounted within circular housing 55 upon the end of shaft 47 for rotation therewith. Fluid is delivered to housing 55 from reservoir 26 by interconnecting conduit 56.

The fluid delivery pipe 57 interconnects the interior of turbine housing 55 shown diagrammatically, and chamber 29 within the top of cylinder 30, with one-way check valve 58 interposed.

On transferring over to accelerator 40 it is seen that pressure fluid is now supplied to chamber 29 through both conduits 28 and 57 so that during a reduction of speed there will still be sufficient pressure fluid in said chamber to hold piston 31 down thereby maintaining the transmission in "high." It also follows that for continuous driving pressure fluid supplied through both conduits cooperates to maintain said transmission in "high."

In slowing down and in stopping the pressure of fluid in chamber 29 drops until compressed spring 33 is effective to return piston 31 to its initial inoperative position, with fluid in chamber 29 returned to the oil reservoir through conduit 28, housing 25 and conduit 27.

In Figure 2 a slightly different form of transmission control is shown in that one turbine pump is omitted. Here rotating shaft 23 controls turbine 25 for delivering pressure fluid out of conduit 28 to the corresponding chamber 29 within the top of cylinder 30, to effect movements of spring returned piston rod 32 all in the manner above described.

However, on initial operation and starting using accelerator 39 the flow of fluid in pipe 28 is constricted by fluid control valve 59 having rotary member 60 therein. As shown in the drawing, in the normal position of rotary valve 60 as shown in solid lines the opening therethrough is partially biased across the openings of conduit 28 to constrict the flow of pressure fluid therethrough.

Accelerator 40 is pivotally joined to lever 61 at point 62 and is resiliently retained in the inoperative position shown in the drawing by coil spring 63. Lever 61 is pivotally mounted at 64 with its outer slotted end pivotally joined at 65 to actuating arm 66 of rotary valve 60.

Thus with accelerator 40 inoperative, the vehicle starts under control of accelerator 39; however only a constricted flow of pressure fluid is delivered through pipe 28 for actuating piston rod 32. Said rod is moved only partially forward to partially project shaft 13 towards shaft 17 in hydraulic transmission 16.

As the vehicle speed increases and it is desired to go into "high," the operator switches over to the second accelerator 40 which results in the rotation of lever 61 in a clockwise direction. In turn arm 66 of valve member 60 rotates to the dotted line position shown fully opening up communication between the respective ends of conduit 28. A full non-constricted flow is now delivered through conduit 28 supplying the maximum pressure fluid for a given speed, all in the manner above described, and piston rod 32 is moved to its extreme forward "high" position.

When accelerator 40 is manually released spring 63 returns the same to its initial position also returning the rotary valve member 60 to its initial fluid constricting "low" position.

A variation of the invention is shown in Figure 3 wherein piston 31 functions to deliver fluid 67 out of cylinder 30 and through conduit 68 whose outer end communicates with the interior of hydraulic transmission 16 shown fragmentarily in Figure 3.

The operation of piston 31, Figure 3, is the same as the operation of piston 31 described in detail in Figure 1, with the exception that there is no moving piston rod, and no need for moving shaft 13 longitudinally. The principle of operation is that the transmission may be controlled between "low" and "high" by adding fluid to the fluid content of said transmission.

For "low" under accelerator 39 pressure fluid effects movement of piston 31 to deliver additional fluid to the transmission at the same time compressing spring 33. If the speed is reduced reducing the pressure of fluid in line 28, piston 31 will return with fluid also returning to the interior of cylinder 30 from said transmission.

However, to go into "high" and stay there it is necessary to change over to accelerator 40 whereby additional pressure fluid is delivered through conduit 57 in the manner above described. A maximum fluid pressure is thus established to move piston 31 to its extreme position delivering the maximum of fluid to transmission 16 for "high gear." Thus, even though the vehicle slows down, as long as accelerator 40 is employed the vehicle will stay in "high"; and this follows inasmuch as pressure fluid is continuously delivered through both conduits 28 and 57.

It is contemplated that the principle of this invention may be carried out by substituting a mechanical transmission for the conventional transmission shown in the drawing. In other words, the drive shaft would carry a gear on its end which would normally be enmeshed with gears arranged in a circle on a disc on the driven gear, but where said disc has a plurality of sets of concentric teeth. In this construction the drive shaft gear would be adapted for movement towards the center of the driven shaft gear wherein the inner rows of teeth are progressively smaller numbers whereby the ratio between the drive shaft and the driven shaft may be decreased.

The subject matter last referred to is illustrated in Figure 4 of the drawing which diagrammatically shows a mechanical transmission as a slight variation of the present invention.

For illustration drive shaft 13' has a gear 69 at its outer end rotatable therewith. Disc 70 is mounted on axle shaft 18 and has a plurality of concentric sets of teeth 71, 72, and 73 which are arranged in staggered relation as shown.

The outer row of teeth 71 have the largest number of gear segments, the central row 72 an intermediate number, and with the central row 73 the least number of gear teeth. As the vehicle starts up it is in "low speed" with gear 69 in mesh with the outer row of gear teeth 71 of gear 70.

Gear 69 on shaft 13' is adapted for progressive engagement with gear teeth 72, or 73 as the vehicle goes into "high," in the manner above described. Shaft 13' will move in the opposite direction as the vehicle slows up and gear 69 will be reengaged with either row of gear teeth 72 or 71.

Disc 70 is illustrated as being mounted on shaft 18 for driving the same, however said disc may be an idler gear with the drive shaft 17 shown in Fig. 1 having a gear on its inner end similar to gear 69 which is at all times enmeshed with the outer row of teeth 71.

Having described my invention, reference should now be had to the claims which follow for determining the scope thereof.

I claim:

1. A control for a vehicle transmission having fluid driving vanes which are bodily translatable towards and away from the fluid driven vanes, reciprocal motor driven rotary means upon which said driving vanes are mounted, and hydraulic means joined to said rotary means for bodily moving the same, and pressure fluid delivery means operated by the vehicle and joined to said hydraulic means.

2. A control for a vehicle transmission having fluid driving vanes which are bodily translatable towards and away from the fluid driven vanes, reciprocal motor driven rotary means upon which said driving vanes are mounted, hydraulically reciprocal means joined to said rotary means for bodily moving the same responsive to variations in the speed of vehicle movement, and pressure fluid delivery means operated by the vehicle and joined to said hydraulic means.

3. A control for a vehicle transmission having fluid driving vanes which are bodily translatable towards and away from the fluid driven vanes, reciprocal motor driven rotary means upon which said driving vanes are mounted, hydraulically reciprocal means joined to said rotary means for bodily moving the same responsive to increasing speed of movement of the vehicle, and pressure fluid delivery means operated by the vehicle and joined to said reciprocal means.

4. A control for a vehicle transmission having fluid driving vanes which are bodily translatable towards and away from the fluid driven vanes, reciprocal motor driven rotary means upon which said driving vanes are mounted, hydraulic means joined to said rotary means for bodily moving the same in one direction responsive to increasing speed of movement of the vehicle, resilient means for moving the same in the opposite direction responsive to decreasing speed of movement, and pressure fluid delivery means operated by the vehicle and joined to said hydraulic means.

5. A control for a vehicle transmission having fluid driving vanes which are bodily translatable towards and away from the fluid driven vanes, reciprocal motor driven rotary means upon which said driving vanes are mounted, hydraulically reciprocal means joined to said rotary means for bodily moving the same in one direction, resilient means for moving the same in the opposite direction, and pressure fluid delivery means operated by the vehicle and joined to said hydraulic means.

6. A control for a vehicle transmission having fluid driving vanes which are bodily translatable towards and away from the fluid driven vanes, reciprocal motor driven rotary means upon which said driving vanes are mounted, hydraulically reciprocal means joined to said rotary means for bodily moving the same responsive to increasing speed of movement of the vehicle, pressure fluid delivery means operated by the vehicle and joined to said reciprocal means, and secondary manually controlled pressure fluid delivery means operated by the vehicle and joined to said reciprocal means to maintain said bodily movable means in advanced position at reduced vehicle speeds.

7. A control for a vehicle transmission having fluid driving vanes which are bodily translatable towards and away from the fluid driven vanes, reciprocal motor driven rotary means upon which said driving vanes are mounted, hydraulically reciprocal means joined to said rotary means for bodily moving the same responsive to increasing speed of movement of the vehicle, pressure fluid delivery means operated by the vehicle and joined to said reciprocal means, a secondary vehicle accelerator, and secondary pressure fluid delivery means controlled thereby and operated by the vehicle, joined to said reciprocal means to maintain said bodily movable means in advanced position at reduced vehicle speeds.

8. A control for a vehicle transmission having fluid driving vanes which are bodily translatable towards and away from the fluid driven vanes, reciprocal motor driven rotary means upon which said driving vanes are mounted, a hydraulic motor with a reciprocal member joined to said rotary means for bodily moving the same responsive to variations in the speed of vehicle movement, a vehicle operated pressure fluid source joined to said motor, a secondary motor accelerator, and a secondary vehicle operated pressure fluid source controlled thereby and joined to said motor to maintain said rotary means in advanced position at reduced vehicle speeds.

9. A control for a vehicle transmission having fluid driving vanes which are bodily translatable towards and away from the fluid driven vanes, reciprocal motor driven rotary means upon which said driving vanes are mounted, hydraulically reciprocal means joined to said rotary means for bodily moving the same responsive to increasing speed of movement of the vehicle, pressure fluid delivery means operated by the vehicle and joined to said reciprocal means, a fluid constricting valve intermediate said reciprocal means and said fluid delivery means, a secondary motor accelerator, and means interconnecting the latter and said valve for removing the restriction therein on manual application of said second accelerator.

10. A control for a vehicle transmission having fluid driving vanes which are bodily translatable towards and away from the fluid driven vanes, reciprocal motor driven rotary means upon which said driving vanes are mounted, hydraulically reciprocal means joined to said rotary means for bodily moving the same responsive to increasing speed of movement of the vehicle, pressure fluid delivery means operated by the vehicle and joined to said reciprocal means, valve means intermediate said reciprocal means and said fluid delivery means, a rotary fluid constricting valve member in said valve means normally constricting the flow of pressure fluid therethrough, and a secondary accelerator joined to said rotary valve means for removing said constriction on manual application thereof.

JAMES L. O'ROURKE.

REFERENCES CITED

The following references are of record in the file of this patent:

UNITED STATES PATENTS

| Number | Name | Date |
| --- | --- | --- |
| 975,795 | Radcliffe | Nov. 15, 1910 |
| 1,672,232 | Saives | June 5, 1928 |
| 1,861,008 | Hayes | May 31, 1932 |
| 2,014,944 | Martyrer et al. | Sept. 17, 1935 |
| 2,025,472 | Perry | Dec. 24, 1935 |
| 2,073,357 | Wemp | Mar. 9, 1937 |
| 2,130,895 | Ness | Sept. 20, 1938 |
| 2,226,801 | Black | Dec. 31, 1940 |
| 2,318,187 | Addison | May 4, 1943 |
| 2,336,167 | Dillon | Dec. 7, 1943 |
| 2,380,074 | Roche | July 10, 1945 |
| 2,395,047 | Hanson | Feb. 19, 1946 |
| 2,416,948 | Pavlecka | Mar. 4, 1947 |